J. H. HAMMOND, Jr.
WIRELESS CONTROL APPARATUS.
APPLICATION FILED NOV. 27, 1909. RENEWED NOV. 6, 1915.
1,419,376.
Patented June 13, 1922.
5 SHEETS—SHEET 1.
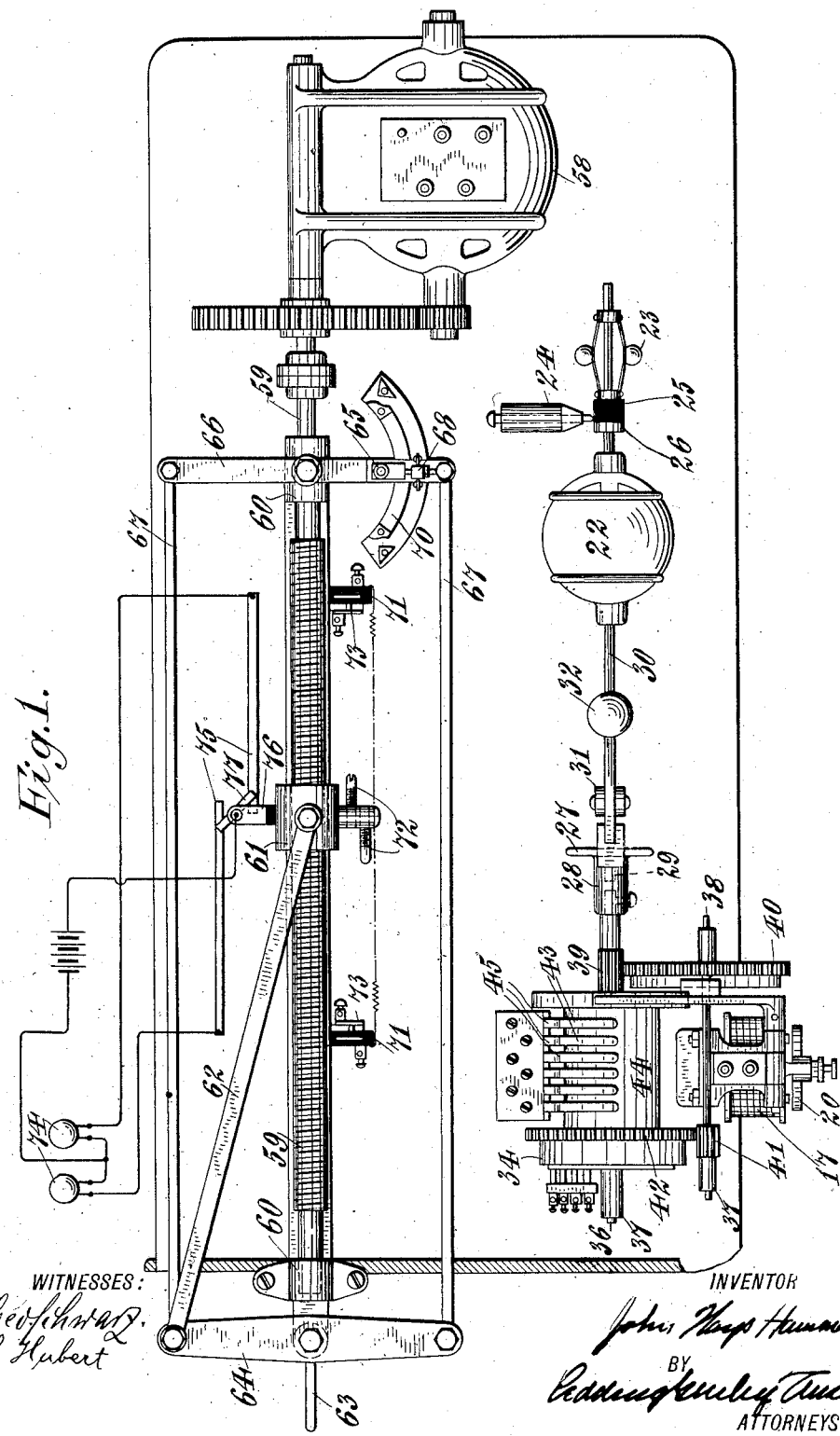
WITNESSES:
INVENTOR
BY
ATTORNEYS

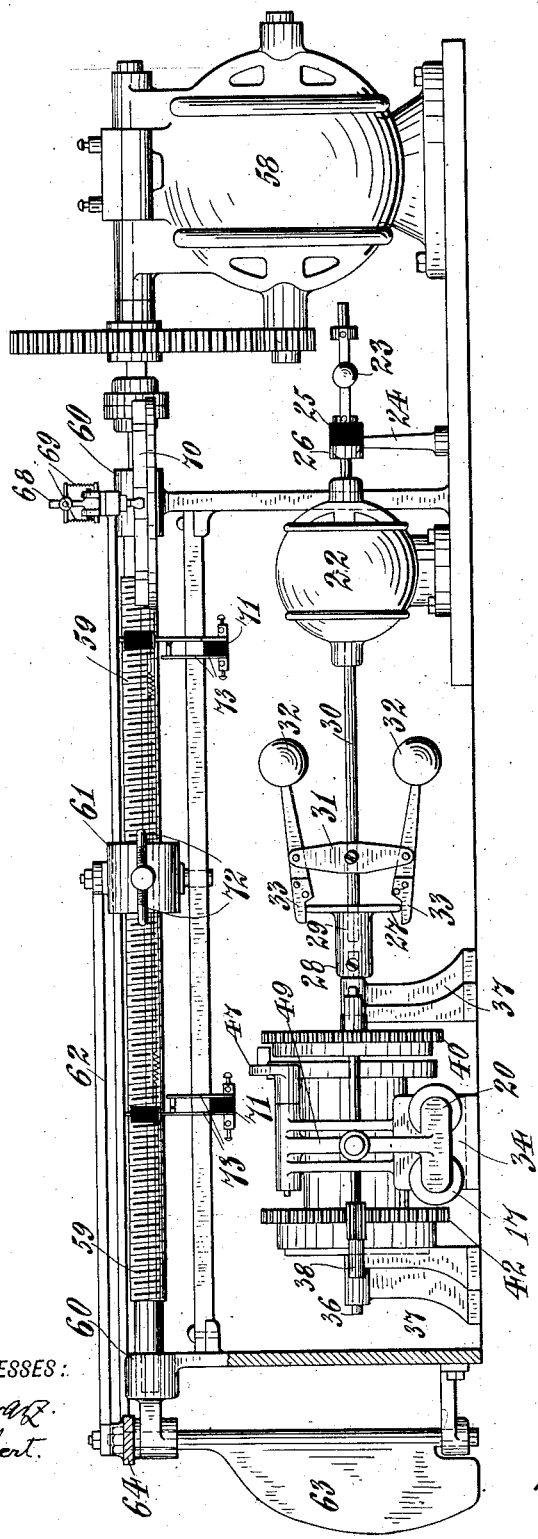

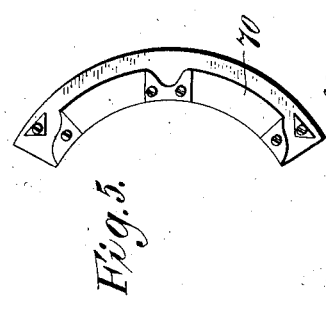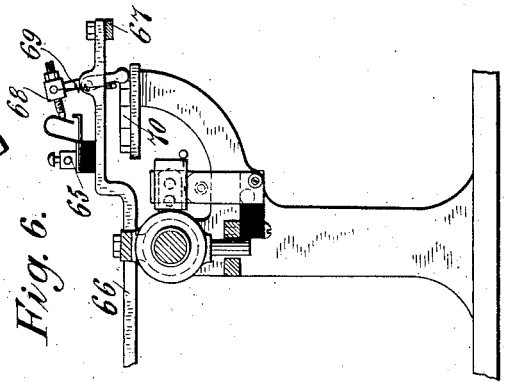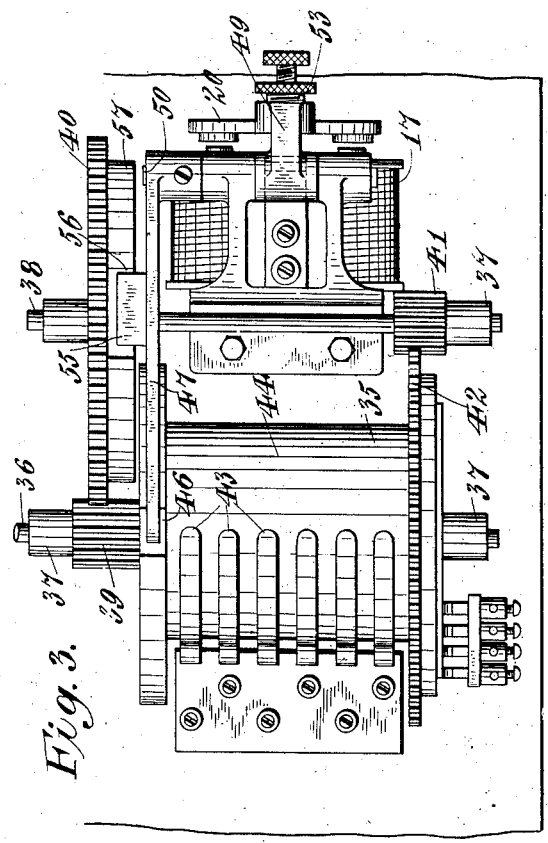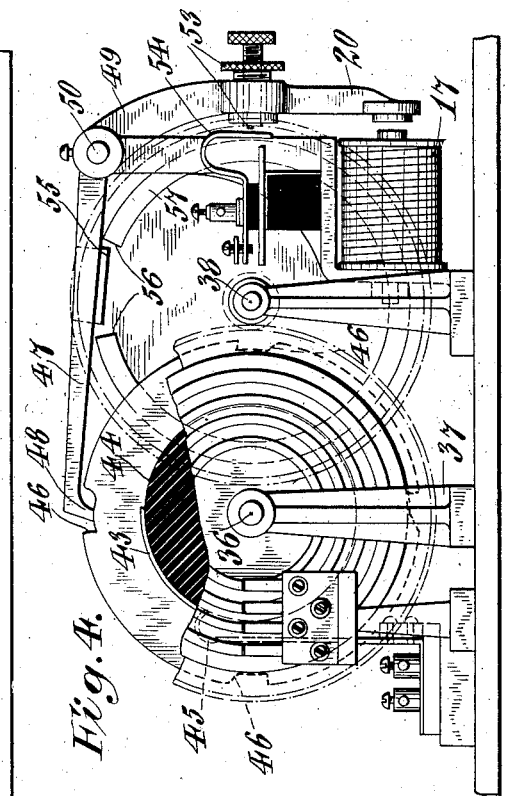

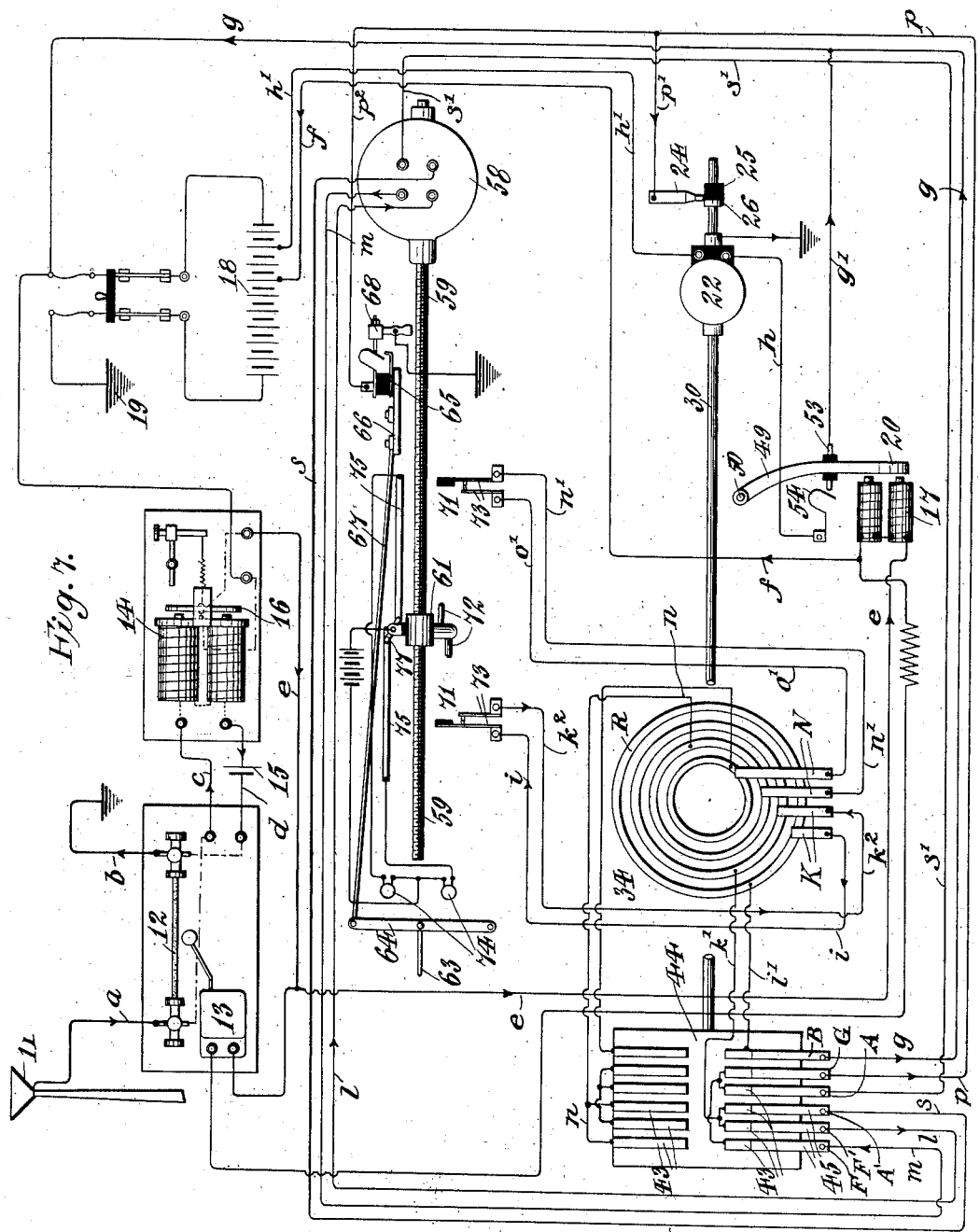

J. H. HAMMOND, Jr.
WIRELESS CONTROL APPARATUS.
APPLICATION FILED NOV. 27, 1909. RENEWED NOV. 6, 1915.
1,419,376.
Patented June 13, 1922.
5 SHEETS—SHEET 5.
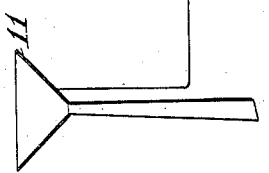
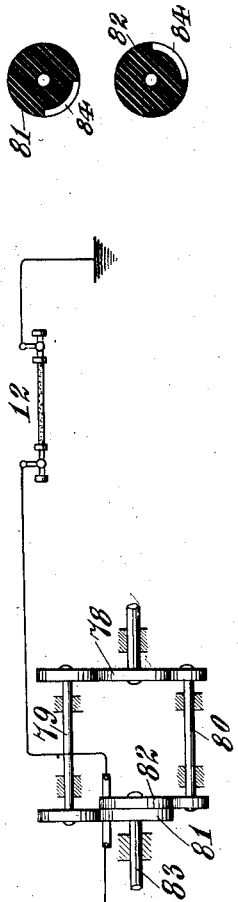
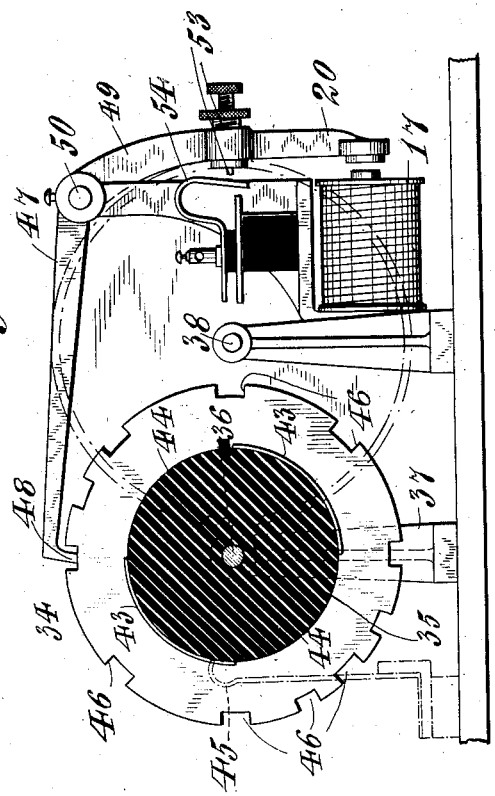
WITNESSES:
INVENTOR
BY
ATTORNEYS

UNITED STATES PATENT OFFICE.

JOHN HAYS HAMMOND, JR., OF GLOUCESTER, MASSACHUSETTS.

WIRELESS CONTROL APPARATUS.

1,419,376. Specification of Letters Patent. Patented June 13, 1922.

Application filed November 27, 1909, Serial No. 530,089. Renewed November 6, 1915. Serial No. 60,165.

*To all whom it may concern:*

Be it known that I, JOHN HAYS HAMMOND, Jr., a citizen of the United States, residing at Gloucester, in the State of Massachusetts, have invented certain new and useful Improvements in Wireless Control Apparatus, of which the following is a specification, reference being had to the accompanying drawings, forming a part hereof.

The invention relates to apparatus controlled by electric waves, impulses or disturbances propagated from a sending station which may be located at a considerable distance from the vehicle, vessel, or movable conveyance of any kind operated by said control apparatus. The invention is particularly applicable for use upon a moving vehicle or vessel such as a torpedo boat or dirigible torpedo, and the principal object of the invention is to provide means whereby not only the direction of movement of such vehicle or vessel can be changed and controlled at will and with certainty, but also whereby various other mechanical devices may be controlled and operated simultaneously and from the same sending station. The further objects of the invention will be more fully set forth in the following description of the invention which consists in the new and novel features of construction and combination of parts hereinafter set forth and claimed.

In the accompanying drawings—

Fig. 1 represents a plan view of a wireless control apparatus embodying my invention applied to the operation of the steering mechanism of a vessel.

Fig. 2 represents a side elevation of the same.

Fig. 3 represents a plan view of one form of controller adapted for use in my improved control apparatus.

Fig. 4 represents an end view of the controller.

Figs. 5 and 6 are detail views showing the construction of the cut out mechanism.

Fig. 7 is a diagrammatic view of my improved control apparatus showing the various connections between the parts.

Fig. 8 is a diagrammatic view illustrating one form of wave selector.

Fig. 9 is a detail view of the selector disks.

Fig. 10 represents an end view of another form of the controller, partly in section.

Referring to the accompanying drawings 11 represents an antenna for receiving the waves which may be propagated from the station, although it is obvious that any other suitable apparatus may be used for this purpose. Said antenna is suitably connected by wire $a$ with a coherer 12 including a decoherer 13 which may be of any suitable construction. The coherer is grounded through wire $b$. The coherer 12 is connected with a suitable relay 14 through conductors $c$ and $d$ having a battery 15 in the circuit. The armature 16 of the relay automatically operates the switch in the circuit $e$, $f$ connecting the operating magnet 17 with the main battery 18 and the ground 19. The armature 20 of the operating magnet 17 through wires $g$, $g'$, $h$, $h'$ automatically opens and closes the local circuit connected with a prime mover such as the pilot motor 22, or with any suitable equivalent therefor. Said motor has a shaft provided with a governor 23 of any desired type operatively connected with a switch of any preferred type such as a sliding sleeve arranged to cooperate with a fixed brush or contact 24, and having an insulating portion 25 and a contact portion 26. The controller 34 is preferably operated from the motor through any suitable clutch which will permit the pilot motor 22 to be started and stopped suddenly without injury to the controller. The particular form of clutch mechanism shown in the drawings constitutes a governor; the end of the controller shaft is provided with a friction disk 27 secured thereto by any suitable means and having its hub 28 provided with a bearing 29 for the free end of the shaft 30 of the motor. Secured to said shaft adjacent to the friction disk is a bearing 31 having weighted arms 32 pivoted thereto. The free ends of said arms may be provided with friction surfaces 33 to engage the friction disk whenever the motor 22 is operated and the arms 32 are thrown apart thus bringing the friction surfaces into engagement with the disk.

The controller 34 may be of any suitable construction but preferably comprises a cylinder 35 mounted loosely on a shaft 36 supported by suitable standards 37. A jack shaft 38 arranged parallel with the controller shaft is driven from a gear 39 secured to the controller shaft and transmits motion to the cylinder through suitable reducing gears 40, 41 and 42. The controller cylinder is preferably made of insulating material and is provided with sets or rows of contacting strips 43 for the forward and reverse running positions of the motor, said rows being arranged to leave neutral spaces 44 between the same. Suitable contact fingers 45 are adapted to engage with the strips and are connected by suitable connections with the main or driving motor and the main battery. The controller is provided with end slip rings R, and brushes K, K and N, N.

The controller drum is provided with a plurality of stops or recesses 46, each row of contact segments and neutral positions having at least one stop corresponding thereto, but more than one stop may be used if desired, as shown in Fig. 10. An arm 47 having suitable means as a hook 48 adapted to engage in said notches forms part of a bell crank lever 49, pivoted as at 50. The free end of said lever is connected to the armature 20 operated by the magnet 17 so that the hook will be lifted from the notch when said magnet 17 is energized, and will ride upon the periphery of the controller drum until the succeeding notch comes beneath the hook which will seat therein unless a continuous impulse is being given and the magnet 17 remains energized. An adjustable contact 53 is mounted upon said lever which is adapted to engage with a contact spring 54 to form a circuit with the motor 22 so long as the hook 48 is in its raised position. If desired the arm 47 may be provided with a block or locking pin 55 adapted to seat in a recess 56 provided in an annular flange or ring 57 secured to the gear 40. The locking ring 57 rotates at a fixed rate with relation to the controller cylinder. As shown in the drawings this ring makes two complete revolutions for each quarter revolution of the controller cylinder, and holds the hook off of the controller between notches. Consequently the hook 48 cannot seat and open the switch formed by contacts 53 and 54 until a notch or stop on the controller drum and a notch in the interlocking ring register with each other.

The main motor 58 is geared to an operating shaft 59. Said operating shaft is mounted in suitable bearings 60 and is threaded to engage with a feed nut or traveller 61 operatively connected to a steering lever 62 which is connected either directly or indirectly with a steering or guiding mechanism as a rudder 63 by any suitable means as a connecting rod 64. The movement of the nut 61 will control the steering lever by turning the same either to starboard or port according to the direction of rotation of the operating shaft as determined by the rotation of the motor.

In order to stop the motor automatically when the feed screw has reached the end of its rotation in either direction, a switch 65 is provided which is controlled by the steering mechanism or rudder. Said switch mechanism may comprise a bar 66 operatively connected to the steering lever by a rod 67 and carrying the switch members, one of which consists of a pivoted arm 68. Said switch member is forced by a spring 69 into engagement with a curved guide 70 which normally holds the switch members in contact, but which is provided at points corresponding to the extreme positions of the rudder, and also if desired at a point or points corresponding with other positions of the rudder, with notches or recesses which throw the switch members out of contact.

Preferably a safety device is provided which will stop the main motor in case the switch 65 becomes inoperative for any reason. One form of safety device is shown in the drawings which comprises two switches 71 adapted to be operated by pins 72 secured to the traveling nut 61 upon the operating shaft. Each switch comprises two members 73, which normally contact with each other. One member of each switch extends into the path of the pins 72 whereby the circuit will be broken whenever such switch member is engaged by one of the pins. The switches are in circuit with the controller and the motor so that the operation of the motor will be automatically stopped when the contact is broken.

For the purpose of guiding the vessel at night pilot lamps 74 are provided which are in circuit with suitable contact strips 75. The traveling nut 61 is provided with an arm 76 carrying a contact finger 77 arranged to engage both of said contact strips when the rudder of the vessel is in its central or straight ahead position so that both lamps will be lighted. When, however, the rudder is moved either to starboard or to port the finger 77 will contact with only one of said strips and only the lamp in circuit with said strip will remain lighted. Consequently the operator is able to determine the position of the rudder and the location of the vessel.

In order to prevent interference with the operation of the apparatus through outside influences, means may be arranged in the circuit whereby only those impulses sent at predetermined times or in predetermined order may be effective. Referring to Figs. 8 and 9 of the drawings one form of selector is shown which comprises a driving gear 78 which may be operatively connected with a motor by any well known means. Said driving gear is connected through separate counter shafts 79, 80 with discs 81 and 82 rotating upon a spindle shaft 83. Said discs are rotated at different speeds determined by the train of gears connecting the same with the driving gear 78. Each disc is provided with a segment of copper 84, or other suitable conducting material, and the segment of one of said discs, as 81, is connected with the antenna and the segment on the other disc, as 82, is connected with the coherer. Consequently, it will be seen that the steering apparatus can be operated only when the segments are in contact and that the intervals between contacts as well as the periods of contact may be caused to vary as desired by changing the relative sizes of the gears. The period when the segments are in contact may be determined at the sending station by a similar selector operating in synchronism with the one provided on the vehicle being controlled.

The operation of the control apparatus is as follows: Assuming that the steering mechanism on the vessel or the vehicle provided with the control apparatus is in straight ahead position and it is desired to change the position thereof an impulse is sent from the shore or any suitable sending point which may be on another vessel. Such impulse will be received by the antenna and operates the coherer, and, since the relay 14 is in circuit with the coherer, the armature 16 of the relay will close the circuit to the operating magnet 17 which is in circuit with part of the battery. The armature 20 of the operating magnet 17 closes the circuit connecting the motor or other prime mover 22, and the rotation of the motor shaft operates the centrifugal governor 23 and actuates the switch to establish a ground connection for the main motor and the battery. Meanwhile the locking lever 47 has been released from the notches on the controller cylinder by the operation of the magnet 17 thus permitting the controller to rotate.

The main motor circuit for the position of the controller shown in Figure 7, is as follows:— from ground 19, battery 18, switch wire $g$, contact finger B, wire $l'$ through one of the rings R to one of the brushes K, wire $i$, left switch 71, wire $k^2$, right hand brush K, wire $k'$, to contact fingers F' and A', connected in parallel. One branch of the circuit then goes through the field of the motor 58 by wires $l$ and $m$, returning to finger F, thence to finger G and then through wires $p$ and $p^2$, and when contact 65 is closed through it to ground. The other branch goes from finger A' by wire $s$ through the armature of motor 58 returning by wire $s'$ to finger A, thence to finger G and to ground through wire $p$ like the other branch.

When the upper set of contacts shown in Figure 7 are in engagement with the fingers the circuits are substantially the same except that the current passes in a reverse direction through the field of motor 58, passing in a loop through wires $o$, $n$, to brushes N and by wires $o'$ $n'$, to the right hand switch 71.

If the controller is in neutral position it will be moved by the pilot motor into operative position whereupon the main motor will be energized and will actuate the rudder or other steering device through the shaft, traveling nut and connecting mechanism. If no other impulse be sent the main motor will continue to operate until the rudder or other steering device comes to its extreme position when the circuit is automatically broken by the switch 65, or if this switch should be out of order then by the safety device comprising the switches 71. If, however, the operator send another impulse before the steering device reaches its extreme position the controller cylinder is rotated until the contacts rest upon the neutral spaces, thus breaking the circuit and leaving the steering device in its desired position.

It is obvious that by sending a succession of impulses the position of the controller and the operation of the steering mechanism may be absolutely controlled and the vessel or other vehicle provided with the control apparatus may be directed at will. The arrangement of switches and of clutches operated by centrifugal governors or equivalent means prevents spasmodic operation of the mechanism or injury to the mechanism due to faulty adjustment. Although the controller mechanism has been shown as adapted to the steering mechanism of a vessel it is obvious that it may be used in controlling vehicles or moving bodies of almost every description which require actuation of a steering mechanism to determine their direction.

Various changes may be made in the details of construction of the apparatus herein shown and described which are within the skill of the mechanic without departing from the spirit of the invention provided the means set forth in the following claims be employed.

What I claim is:

1. In a wireless control apparatus, the combination with a main motor, of a second motor provided with a governor, a controller in circuit with said main motor and affecting the circuit through said motor, and a switch in said circuit automatically actuated by said governor.

2. In a wireless control apparatus, the combination with a motor, of a rotatable controller, an automatically operated clutch between said motor and controller, electric driving mechanism having circuits through said controller, said controller being driven by said motor, and means for energizing said motor in response to radiant energy.

3. In a wireless control apparatus, the combination with a pilot motor, of a governor driven by said motor, a controller, a clutch mechanism actuated by said governor between said controller and motor, and means for actuating said motor by impulses, and a main motor controlled by said controller.

4. In a wireless control apparatus, the combination with an operating motor, of a controller in circuit with said operating motor, a local circuit and a second circuit, a lever having a contact in said local circuit and engaging said controller at predetermined points to regulate the rotation of said controller and to hold same in its adjusted position, said lever being operated through the medium of said second circuit, and means for closing said second circuit by wireless impulses.

5. In a wireless control apparatus, the combination of a controller having a drum, a motor for operating said controller, a local circuit including an electromagnet effecting the actuating of said motor, a motor having circuits which may be closed by said controller drum, means for advancing said drum with a step by step movement and means for closing the said local circuit through said electromagnet by wireless impulses.

6. In a wireless control apparatus, the combination of a controller having a drum with active and neutral positions, a motor for operating said controller, a local circuit including an electromagnet to actuate said motor, a second motor, circuits connecting said motor with said drum and adapted to be closed by said drum when in the active positions thereof and means for closing said local circuit through said electromagnet by wireless impulses.

7. In a wireless control apparatus, the combination of a controller having a rotatable drum, said drum having active and neutral positions, means for holding said drum in an active position, a motor for rotating said controller, a local circuit including an electromagnet to energize said motor, a main motor, a circuit connecting said motor with said drum for driving said motor in opposite directions and arranged to be closed by said drum only when in an active position, and means for closing said local circuit through said electromagnet by wireless impulses.

8. In a wireless control apparatus, the combination of a controller, means for holding said controller in active and neutral positions, a motor for operating said controller, a local circuit including an electromagnet for effecting the actuation of said motor, means for rotating said controller with a step by step movement, a motor controlled by said controller, circuits connecting said motor with said controller and arranged to be closed only when said controller is in an active position and means for closing said local circuit through said electromagnet by wireless impulses.

9. In a wireless control apparatus, the combination of a controller provided with a plurality of stops, a lever engaging said stops, a rotating locking ring, and means on said lever engaging said locking ring driven at a speed different from the speed of said controller to permit certain of said stops to pass the same and to hold said controller drum and locking ring in predetermined relation to each other.

10. The combination with an operating motor, of a steering device having a traveller actuated by said motor, contacts carried by said steering device in the path of said traveller at the limit of movement thereof and adapted to interrupt solely the circuit of the operating motor, a local circuit, and means connected therewith for controlling the operating motor, and a circuit including an electromagnet for controlling the local circuit and means for closing said controlling circuit.

11. In a wireless control apparatus for a steering mechanism, the combination of a coherer, a relay, a magnet in circuit with said relay, a pilot motor in a local circuit, a switch in said local circuit actuated by the armature of said magnet, a controller rotated by said pilot motor, an operating motor in circuit with said controller, switches in the circuit between the controller and the main motor and contacts arranged to be actuated by said main motor to operate said switches in predetermined positions of the steering mechanism to interrupt said circuit.

12. In a wireless control apparatus the combination with a main motor, of a second motor provided with a governor, a controller in circuit with said main motor and a switch in said circuit automatically actuated by said governor, a rudder, and automatic means for stopping the rudder in an extreme position.

13. In a wireless control apparatus, the combination of a controller and motor, steering mechanism actuated by said motor, circuits connecting said controller with said motor and controlling said motor, means for actuating said controller by wireless impulse to close one of said circuits, to drive said motor, means for holding said controller against movement while said motor is being actuated through the medium of said first impulse, and means for actuating said controller to arrest said motor through the medium of a second wireless impulse.

14. In a wireless control apparatus, the combination with a main motor, of a second motor provided with a governor, a controller in circuit with said main motor and a switch in said circuit automatically actuated by said governor, a rudder, and automatic means for stopping the rudder in a limiting predetermined position.

15. In a wireless selective control apparatus, a receiving station comprising selectors rotating synchronously with selectors at a transmitting station, conducting pieces on the receiving selectors, an antenna connected with one of said conducting pieces, a wave detector connected with another of said conducting pieces, a relay actuated by said wave detector, a motor energized by said relay, a controller operated by said motor, a second motor controlled by said controller, and mechanism operated by said second motor.

16. The combination with a rotary controller provided with a plurality of stops, of means movable into and out of engagement with said stops, and rotary means arranged to be rotated at a rate different from the rate of rotation of said controller to govern the action of said first mentioned means.

17. The combination with a rotary controller provided with a plurality of stops of an element movable into and out of engagement with said stops, a rotary member operatively connected to said controller and arranged to be rotated at a rate different from the rate of rotation of said controller and operative to determine the position of said element.

This specification signed and witnessed this 9th day of November, A. D. 1909.

JOHN HAYS HAMMOND, Jr.

Signed in the presence of—
AGNES L. REILLY,
AMBROSE G. O'SHEA.